Aug. 8, 1933. J. CARLSSON 1,921,558
DUMPING CAR
Filed Dec. 3, 1930 3 Sheets-Sheet 3

Inventor:-
Johan Carlsson
by Lanpur, Parry, and Lanpur
Attys.

Patented Aug. 8, 1933

1,921,558

UNITED STATES PATENT OFFICE 1,921,558

DUMPING CAR

Johan Carlsson, Landskrona, Sweden

Application December 3, 1930, Serial No. 499,833, and in Sweden December 17, 1929

5 Claims. (Cl. 298—21)

My present invention refers to improvements in dumping cars, especially motor lorries, in which the load carrying platform, for the purpose of permitting a dumping towards either of its two sides or rearwardly, at its forward end is supported by two longitudinal pivot pins in fixed bearings, one at each side of the car, and at its rear end by two similar pivot pins mounted in bearings turnable around a transverse axis, the dumping device being driven by means of a winch and wire arrangement forming the subject matter of the invention.

Figure 1:
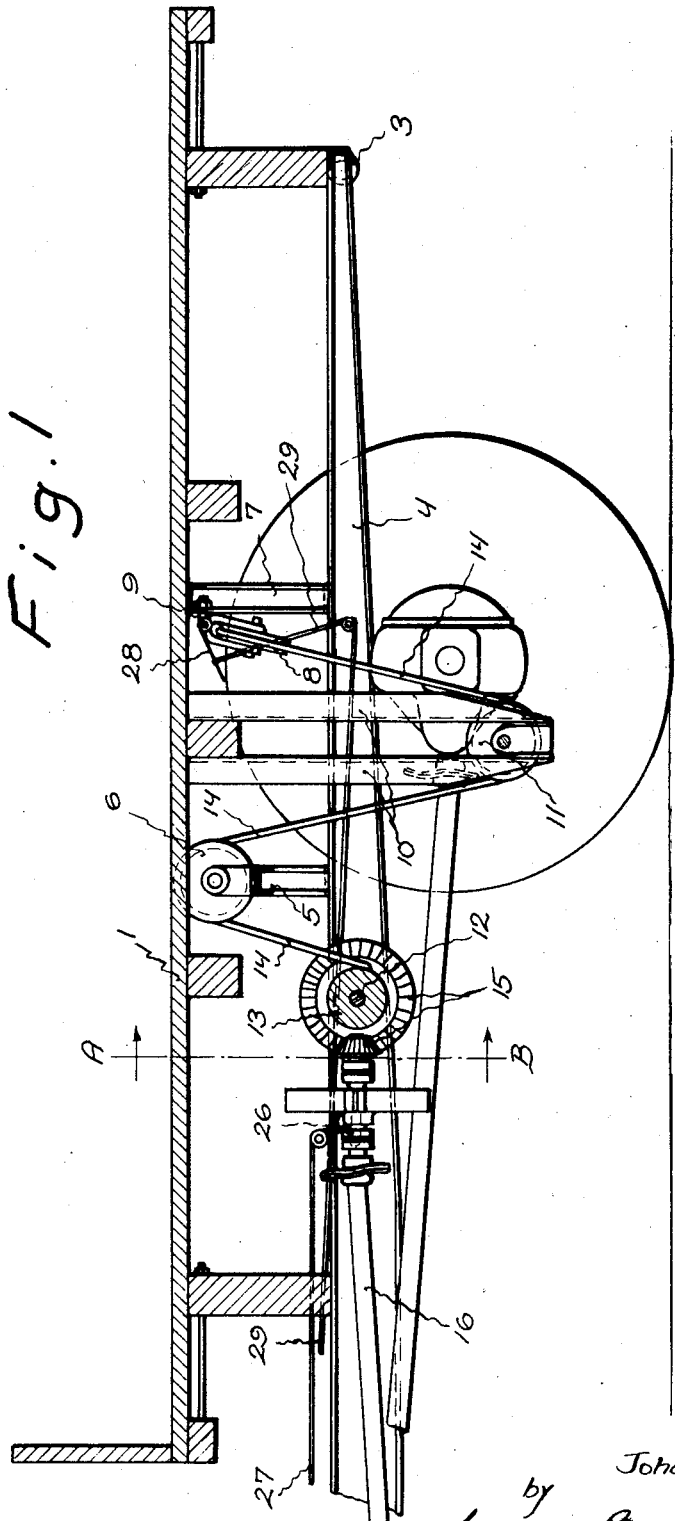
Figure 2:
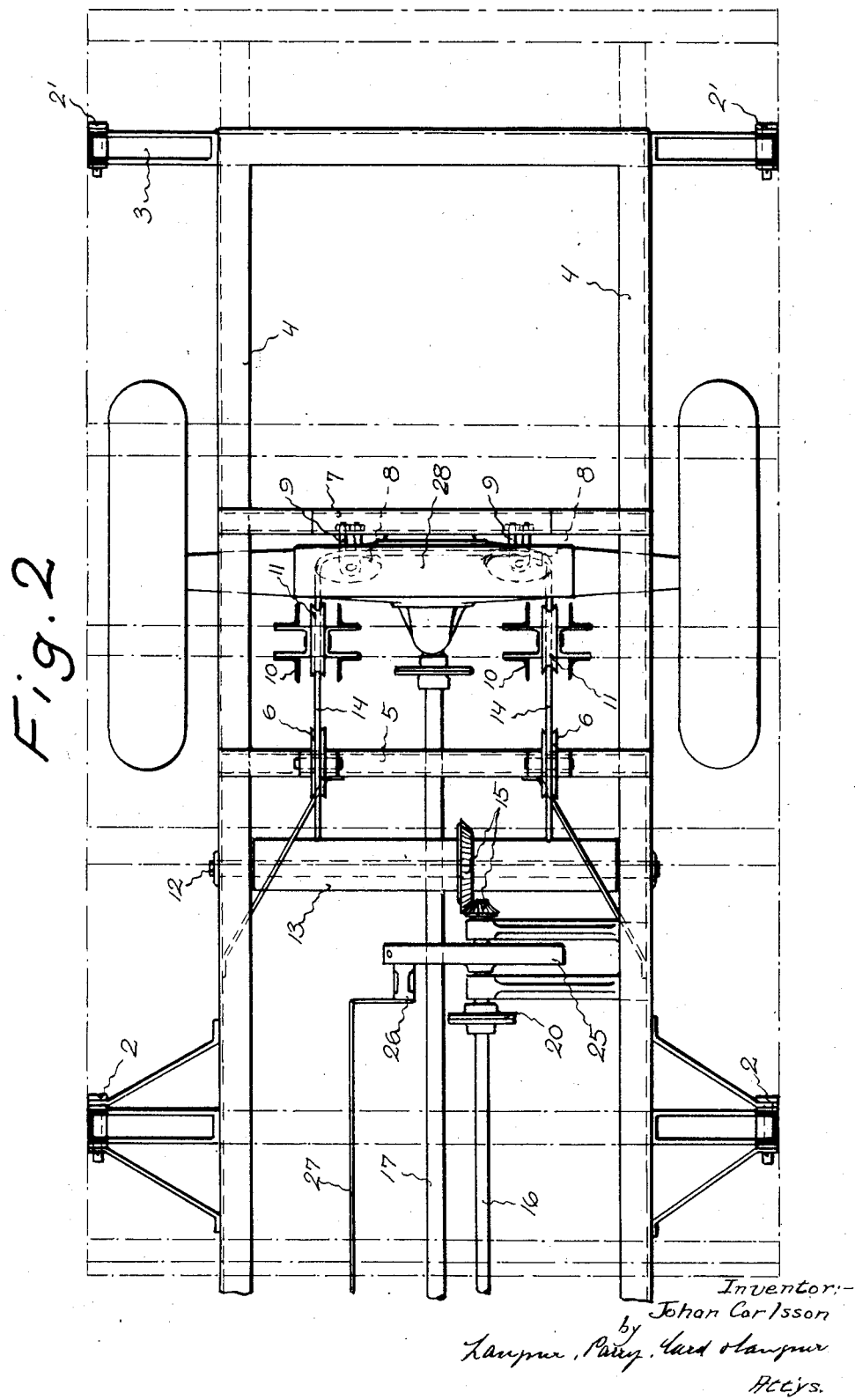
Figure 3:
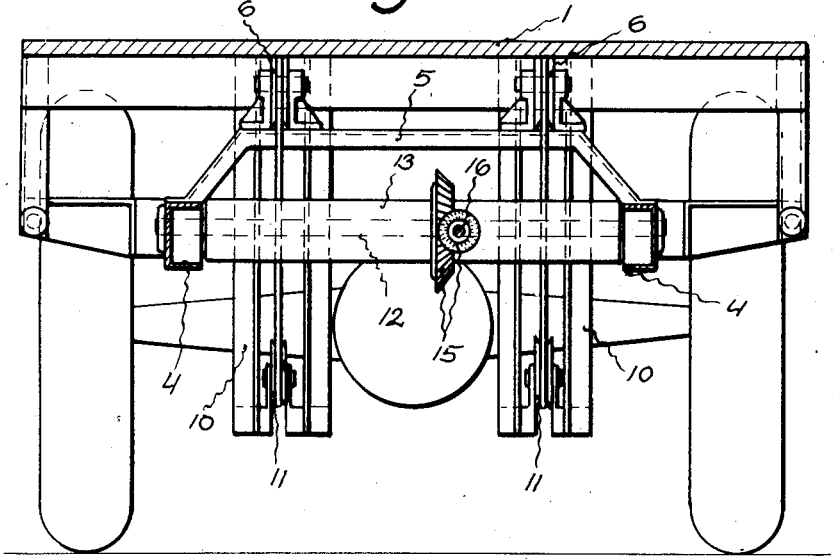
Figure 4:
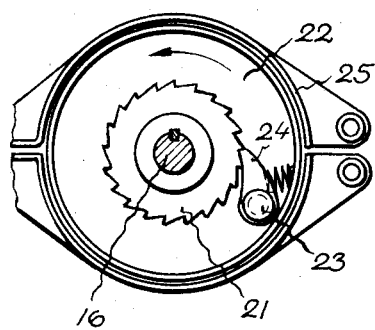
Figure 5:
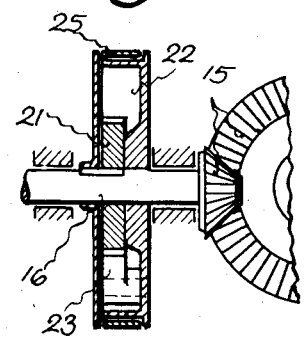
Figure 6:
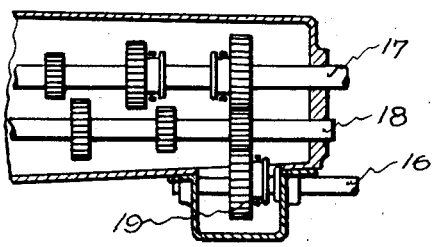

The invention is illustrated in the accompanying diagrammatical drawings in which, Fig. 1 shows the rear end of a motor lorry provided with the dumping means according to the invention and seen in side elevation partly in section, Fig. 2 is a plan view of Fig. 1, the platform being removed for the sake of clearness and indicated in dot and dash lines, Fig. 3 shows a cross section of Fig. 1 at the line A—B and viewed in the direction of the arrows, Fig. 4 is a side elevation of a brake device forming part of the construction, the end cover on the brake drum being removed for making the interior parts visible, Fig. 5 is a longitudinal section of the brake device shown in Fig. 4, and Fig. 6 a longitudinal section of the change speed gear box as modified for the purpose of applicability according to the invention.

According to the drawings, the load carrying platform 1 is supported by a suitable framing construction and rests on four pivot pins 2 positioned parallel to the direction of length of the car and axially slidable in their bearings, such pivot pins being arranged in pairs at each side of the car and adjacent to the edges of the platform. The two rearmost pivot pins 2' are mounted in a transverse shaft 3 supported by the under frame or chassis of the car. By withdrawal of the two foremost pivot pins 2, the platform may be dumped rearwardly by turning around the shaft 3, and by withdrawal of the two pins 2, 2' at one of the platform sides, the platform may be dumped toward the opposite side.—The constructional means thus described may be considered to be known per se, and they form no characteristical feature of the invention.

The fixed car frame has the reference 4 in the drawings, and it serves by means of a foremost transverse beam construction 5 of any suitable kind to support a pair of interspaced grooved disc pulleys 6 rotatably mounted on substantially horizontal shafts positioned transversely and substantially perpendicularly to the direction of length of the car. By means of a rearmost transverse beam construction 7 of any suitable kind, the fixed car framing 4 serves also as a support for another pair of interspaced grooved disc pulleys 8, the shafts of which are approximately parallel to the direction of length of the car. The pulleys 9 are not fixedly supported, however, as may be the case in respect of the pulleys 6, but their shafts by means of fork-shaped hinge connections 9 are tiltably mounted so that the pulleys are able to swing substantially in a vertical plane. It will be understood from the drawing (Fig. 2) that the pulleys 9 are positioned in a manner so that their outer edges touch a vertical plane through the corresponding pulley 6.

The under side of the platform 1 is provided with a pair of interspaced and depending hanger frames 10 each supporting at its lower end a grooved disc pulley 11, such pulleys being mounted on shafts positioned substantially perpendicular to the direction of length of the car, and when the platform is in horizontal position they take a position substantially in the same vertical plane as the corresponding pulley 6. The pulleys 11 ought to be hingedly mounted, however, in order to permit them to tilt or swing in a vertical plane substantially perpendicular to the plane of the swinging movement of the pulleys 8.

In front of the foremost beam construction 5, the car framing 4 supports a shaft 12 mounted in fixed bearings and provided with a winch drum 13. At one of its ends a metal wire 14 is fixed to the said drum 13 and carried in zigzag rearwardly over the pulleys 6, 11, 8 at the one side of the car, thereafter transversely to the opposite pulley 8, and thence forwardly over the pulleys 11, 6 at the opposite side of the car. The other end of the wire may also be affixed to the drum 13, or else it may be connected with a fixed point of the car framing.—Hence, it will be understood that the wire will take a position as shown in Fig. 1 in comparison with Fig. 2, and a rotation of the winch drum 13 will have a tensional effect on the wire.

Although not positively needed for the function of the device, it is apparent that other or additional wire pulleys than those described may also be used for guiding the wire in case of necessity due to constructional obstacles forming part of the under frame of the car.

When the winch drum is rotated, a tensional stress is effected in the wire, as aforesaid, and one or both ends of the wire travel in the direction of the drum from either or both of the pulleys 6. Thereby the pulleys 11 will be forced upwardly supported by the pulleys 6 and 8, so that a dumping movement by means of the hanger frames 10 is transmitted to the platform 1 in a manner easily understood by those skilled in the art, and the direction of the dumping movement will be determined by the pins 2, 2' withdrawn from their bearings. Irrespective of the direction of the dumping, the tensional stress in the wire 14 will be uniform throughout the whole length of the same.

Naturally, it is favourable if the different turns of the wire wound up on the drum 13 are placed side by side on said drum, and perhaps some additional guide pulleys (not shown) are needed for such purpose, or else the drum may be provided with spiral grooves for guiding the wire. Besides, it is evident that it is not necessary to use one single winch drum for both ends of the wire, as indicated in the drawings, but a separate drum for each end may also be used, and if one end of the wire is connected with a fixed point of the framing, one single drum of the last-mentioned kind is needed only. It is obvious, however, that irrespective of the direction of the dumping movement the pulleys 8 will be swung upwards in a clockwise direction as viewed in Fig. 1, when dumping.

The rotational movement of the drum 13 is preferably transmitted to the same by means of a bevelled gear 15, one wheel of which is affixed to the drum shaft, the other being affixed to a driving shaft 16 adapted to be rotated by the motor car engine by the intermediary of the common change speed gear. The driving shaft 16 is preferably mounted along the Cardan shaft 17, which in a common manner is connected with the change speed gear (Fig. 6).

The change speed gear is constructed in the conventional manner and provided with a slidable shaft 18 supporting a number of gear wheels for the different speeds ahead. In a supplementary casing affixed to the gear box is mounted an additional gear wheel 19 affixed to the shaft 16 in opposition to the gear wheel on the shaft 17 corresponding to the lowest speed, and by means of a common gear shift handle (not shown) the wheel 19 may be thrown in and out just in the same manner as the other gear wheels. In the position of the gears shown in Fig. 6, the wheels are intermeshing for a simultaneous dumping and forward drive at low speed, which possibility is also at hand due to the construction described. In order to avoid undue stresses on the bearings, the shaft 16 ought to be provided with a couple of universal joints 20 (one of which is shown in the drawings only).

The manner in which the dumping movement is to be performed will thus be understood from the foregoing, and in a dumped position the platform is intended to be locked by means of a pawl device shown in Figs. 4 and 5. This pawl device consists of a toothed wheel 21 affixed to the shaft 16 and surrounded by a brake drum 22 rotatably mounted on the same shaft, such brake drum by means of a pivot pin 23 supporting a pawl 24, which is spring-actuated so as permanently to tend to go into engagement with the toothed wheel 21. The brake drum 22 is surrounded by a brake strap or a pair of brake shoes 25 which by suitable means (not shown) may be tightened around the drum for the purpose of braking the same. Normally the drum 22 shall be kept effectively braked.

When a dumping is to be performed, the shaft 16 is rotated in the direction of the arrow shown in Fig. 4, and thereby the pawl 24 may freely slide back over the teeth on the wheel 21. As soon as the rotation of the winch drum 13 by means of the shaft 16 has ceased, the pawl 24 will go into engagement with the toothed wheel 21, and since the brake drum 22 is braked, as aforesaid, the platform will be held in the inclination caused by the dumping movement irrespective of the angle of such inclination. Thereafter, if the braking effect on the drum 22 is manually relieved, the pawl 24 will loose its positive support, and the weight of the load platform 1 will cause a return movement of the platform in opposite direction to the dumping movement effected. It will also be understood that the said return movement, by re-application of the brake 25, may be stopped at any angle desired before the platform has arrived in its horizontal position.—The means for manual control of the brake 25 may be mounted in a handy position adjacent to the driver's seat, and the shifting handle for the gear 19 ought naturally also to be given a similar position.

It will be understood, that if the driving means, when dumping, are kept working too long, the V-shaped portions of the wire running around the pulleys 11 will at first be stretched taut and thereafter they will be torn off, in case the driving device is not disengaged in due time. In order to prevent this fatality and to provide for an automatic disengagement of the driving means, the rear transverse beam construction 7 supports a plate 28 hingedly connected with the beam construction preferably on the same shaft 9 as the pulleys 8, such plate extending in opposition to the pulley shafts, so that the plate will be tilted upwardly simultaneously with either or both of said pulleys. By means of a wire connection 29 running over suitable guide pulleys or rolls, the plate 28 is connected with the conventional clutch pedal (not shown) positioned adjacent to the driver's seat and adapted for disconnection of the engine from the change speed gear, i. e. from the driving shaft 17. Hence, when the plate 28 by means of the pulleys 8 has been turned up into a certain predetermined position, it will cause a disengagement of the engine just in the same manner as if this disengagement had been manually performed by actuation of the clutch pedal. When the engine is disengaged, the dumping means will be stopped, and the dumping movement is automatically interrupted when a predetermined angle of inclination has been reached. Therefore the wire 14 cannot be torn off, and besides the advantage is gained that the dumping movement may continue at a considerable speed until the maximal dumping angle is reached, the practical result hereof being that a load, for instance gravel, may be actually thrown off from the platform substantially in the same manner as when unloading the lorry by means of manual shovelling. The advantage hereof will be understood when considering that the main bulk of the load will be removed a relatively greater distance from the car and not permitted to drop down immediately adjacent to and around the wheels, which otherwise frequently occurs when dumping towards either of the sides of the car, and involves the disadvantage that the wheels must in part pass through the dumped load when driving away with the empty car, or else the portions of the load dumped in advance of the wheels must be manually removed before driving away.

On the other hand the car may also be driven ahead simultaneously with the dumping or unloading, provided that the maximal dumping angle is not reached. For instance, when dumping rearwardly, the dumping movement by disengagement of the gear 19 is interrupted when the platform takes a certain inclination, and the car is driven ahead, whereby the load in the form of a continuous layer will be distributed behind the car. Hence, in spite of the simplicity of construction, the possibilities for unloading the car are the greatest possible, and the constructional parts of the dumping device cannot be damaged by rough handling or carelessness in manipulation.

Finally it is to be understood that the invention is not limited to the constructional particulars described above for the sake of explanation, but it may be varied in many respects so as to suit different types of lorries or freight cars in general, this being especially true in respect to the means for supporting and bearing of the different transmission means. In case it should be desired to distribute the tilting action on the platform in more than one or two points, for instance in case of very large lorries, such distribution will be possible if a second pair of hanger frames, similar to the hanger frames 10, are mounted in advance of the latter and the wire carried around pulleys on said additional hanger frames when leaving the pulleys 6 instead of running directly to the winch drum from the last mentioned pulleys.

What I claim and desire to secure by Letters Patent is:—

1. In a dumping vehicle of the character described, an under frame, a load platform tiltably supported by said frame, bearing means for the tilting movement of said frame and adapted to permit the tilting of the same towards either of its sides and backwardly according to will, a foremost transverse beam construction rigidly supported by the under frame, a pair of interspaced wire pulleys rotatably mounted on said beam construction in a plane substantially parallel to the direction of length of the vehicle, a rearmost transverse beam construction rigidly supported by the under frame, a pair of interspaced wire pulleys hingedly supported by this second beam construction and rotatable in a plane substantially transverse to the direction of length of the vehicle, a pair of hanger frames depending from the tiltable platform in a position between the transverse beam constructions, a wire pulley mounted on each of the depending hanger frames in a position below the pulleys carried by the said beam constructions, a wire passing in zig-zag over the pulleys at one side of the vehicle, thereafter transversely over the pulleys on the rearmost transverse beam, and thence in zig-zag over the pulleys at the other side of the vehicle, and means for causing a tension in the wire so as to make it to travel around the pulleys for the purpose of effecting the dumping movement.

2. In a dumping vehicle, according to claim 1, the additional feature that the means for causing the travel of the wire consists of a winch arrangement adapted to be driven from the engine of the vehicle.

3. In a dumping vehicle according to claim 1, the additional feature that the means for causing the travel of the wire consists of a winch arrangement adapted to be driven from the engine of the vehicle by the intermediary of the change speed gear thereon and by means of a disconnectable gear means adapted to be manually controlled for the purpose of throwing in or out the driving connection according to will.

4. In a dumping vehicle of the character described, an under frame, a load platform tiltably supported by said frame, bearing means for the tilting movement of said frame and adapted to permit the tilting of the same towards either of its sides and backwardly according to will, a foremost transverse beam construction rigidly supported by the under frame, a pair of interspaced wire pulleys rotatably mounted on said beam construction in a plane substantially parallel to the direction of length of the vehicle, a rearmost transverse beam construction rigidly supported by the under frame, a pair of interspaced wire pulleys hingedly supported by this second beam construction and rotatable in a plane substantially transverse to the direction of length of the vehicle, a pair of hanger frames depending from the tiltable platform in a position between the transverse beam constructions, a wire pulley mounted on each of the depending hanger frames in a position below the pulleys carried by the said beam constructions, a wire passing in zig-zag over the pulleys at one side of the vehicle, thereafter transversely over the pulleys on the rearmost transverse beam, and thence in zig-zag over the pulleys at the other side of the vehicle, winch means disconnectably connected with the motor car engine and adapted for causing a travel of the wire around the pulleys, and means for automatically disconnecting the connection with the engine when the tilting movement of the platform has proceeded to a predetermined maximal angle.

5. In a dumping vehicle of the character described, an under frame, a load platform tiltably supported by said frame, bearing means for the tilting movement of said frame and adapted to permit the tilting of the same towards either of its sides and backwardly according to will, a foremost transverse beam construction rigidly supported by the under frame, a pair of interspaced wire pulleys rotatably mounted on said beam construction in a plane substantially parallel to the direction of length of the vehicle, a rearmost transverse beam construction rigidly supported by the under frame, a pair of interspaced wire pulleys hingedly supported by this second beam construction and rotatable in a plane substantially transverse to the direction of length of the vehicle, a pair of hanger frames, depending from the tiltable platform in a position between the transverse beam constructions, a wire pulley mounted on each of the depending hanger frames in a position below the pulleys carried by the said beam constructions, a wire passing in zig-zag over the pulleys at one side of the vehicle, thereafter transversely over the pulleys on the rearmost transverse beam, and thence in zig-zag over the pulleys at the other side of the vehicle, winch means connected with the wire and adapted to cause it to travel around the pulleys, intermediate transmission means disconnectably connecting said winch means with the change speed gear of the vehicle, and an unidirectional braking means acting on the said intermediate transmission and adapted normally to prevent its return rotation in a direction opposite to the rotation caused by the engine.

JOHAN CARLSSON.